UNITED STATES PATENT OFFICE.

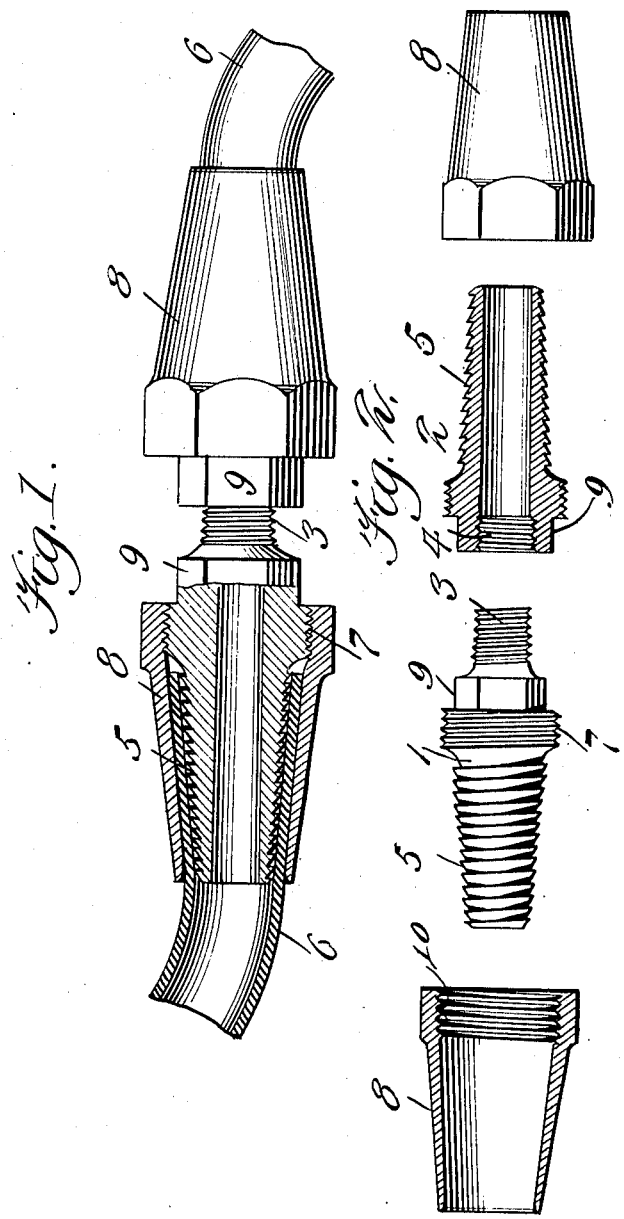

CHARLES DE SALME, OF ST. LOUIS, MISSOURI.

COUPLING.

993,155.  Specification of Letters Patent.  Patented May 23, 1911.

Application filed May 20, 1908. Serial No. 433,875.

*To all whom it may concern:*

Be it known that I, CHARLES DE SALME, a citizen of the United States, residing at St. Louis, in the State of Missouri, have invented new and useful Improvements in Couplings, of which the following is a specification.

This invention relates to detachable pipe couplings, more especially those which are to connect the ends of two hose sections; and the object of the same is to produce a coupling having wrench faces whereby its members may be forcibly disconnected when rusted and yet the act of disconnection will not detach them from the hose ends.

With the above general object in view the invention consists in the novel construction, combination and arrangement of parts herein fully described, illustrated and claimed.

In the accompanying drawings Figure 1 is a plan view of the coupling, one of the coupling members and one of the pipe sections being shown in section. Fig. 2 is a view of the coupling members and clamping cones shown separated.

The coupling of this invention comprises two coupling members 1 and 2 which are the counterpart of each other with the exception that at their inner adjacent ends one of said coupling members is provided with a male threaded extension 3 while the other member is provided with a nut extension having female threads 4 adapted to receive the threaded extension 3 so that both members may be securely fastened together in the manner shown in Fig. 1.

Each of the members is exteriorly tapered outwardly and threaded as shown at 5, the threads resembling those of an ordinary wood screw that is to say the threads are beveled on one side and provided with radial faces at the opposite side so as to obtain a firm hold on the end of a flexible pipe or hose shown at 6, which pipe or hose is adapted to be slipped over the threaded portion 5 of the respective coupling member, the threaded portion of such coupling member being also tapered or made of gradually diminishing diameter toward the outer end thereof in order to facilitate slipping the end of the hose or pipe thereon. Each coupling section is further provided with an enlarged threaded flange 7 adapted to engage female threads 10 at the larger end of a clamping cone 8, which cone slips over the hose section 6 so that by securing said cone upon the threaded flange 7, the hose section 6 is compressed around the threads 5 which thereby embed themselves into the inner surface of the hose securely fastening the coupling member to the hose. In order to permit the cone to be rotated, it is provided around its larger end with a wrench face 18. Next inside the flange 7 each member has a wrench face 9, smaller than the wrench faces 18, and the members differ from each other only as to their threads 3 and 4 and the relative location of these wrench faces 9 with respect thereto. On one member such wrench face surrounds the female threads 4, but on the other such face surrounds the stem and the male threads 3 project a little beyond the wrench face 9 as best seen in Fig. 2.

The parts of this coupling are assembled in a manner which will be clear. When it is desired to disconnect, two wrenches are employed and one is engaged with each angular portion 9, and when these wrenches are moved in relatively proper directions the threads 3 and 4 can be forced asunder and the turning of each member to accomplish this end will serve to tighten the threaded flanges 7 within their cones 8 rather than to loosen them. Hence the wrench faces 18 shown on the cones 8 will not be necessarily employed at this time, although they may be used at any time for tightening the cones on the hose ends. Moreover, the fact that the wrench faces 9 are of a size to take much smaller wrenches than the wrench faces 18, is of advantage because the small wrenches used for coupling and uncoupling this device cannot by accident be applied to the wrench faces 18 and therefore the cones will not be turned and the hose ends disconnected from the metal members. Nor can the wrenches on the portions 9 slip accidentally onto the portions 18 which so often happens where sections of hose are coupled or uncoupled in haste.

What I claim is:

The herein described coupling for hose sections, the same comprising two metallic members of which each has a tapered and externally roughened outer end, next inside said end an enlarged threaded flange, and next inside said flange a wrench face smaller than such flange, one member having female threads within its wrench portion and the other having an extension beyond its wrench portion provided with male threads of the same size as said female threads; combined with two cones tapered interiorly to correspond with the outer ends of said members, having threads within their larger ends corresponding with those on said flanges, and having wrench faces around their larger ends larger than the wrench faces on said members.

In testimony whereof I affix my signature in presence of two witnesses.

CHARLES DE SALME.

Witnesses:
JOHN B. MUTH,
WM. T. KEIL.